Oct. 18, 1966             B. SILLER            3,279,948

POSITIVE ELECTRODE PLATE FOR GALVANIC ELEMENT

Filed July 5, 1962                         3 Sheets-Sheet 1

INVENTOR
BRUNO SILLER
BY
ATTORNEY.

INVENTOR.
BRUNO SILLER
ATTORNEY.

Oct. 18, 1966  B. SILLER  3,279,948
POSITIVE ELECTRODE PLATE FOR GALVANIC ELEMENT
Filed July 5, 1962  3 Sheets-Sheet 3

INVENTOR.
BRUNO SILLER
BY
ATTORNEY.

United States Patent Office 3,279,948
Patented Oct. 18, 1966

3,279,948
POSITIVE ELECTRODE PLATE FOR
GALVANIC ELEMENT
Bruno Siller, Dischingen, Wurttemberg, Germany, assignor to Pertrix-Union G.m.b.H., Ellwangen, Jagst, Germany, a corporation of Germany
Filed July 5, 1962, Ser. No. 207,755
Claims priority, application Germany, July 5, 1961, E 21,334
13 Claims. (Cl. 136—83)

The present invention relates to improvements in air-depolarized cathodes.

It is known that the polarization of primary cells of the same volume decreases with the surface areas of their electrodes. For this reason, it has been proposed to depart from the cylindrical shape of batteries and to shape them so that electrode plates may be used in the cell. In air-depolarized batteries, the plate shape of the electrodes has the additional advantage that the paths of air diffusion may be shortened considerably if the conductive carrier plate for the depolarizer mass is perforated so as to permit access of air to the depolarizer mass.

There is no difficulty in imparting a plate shape to the anode since the same usually consists of zinc sheet. However, since the cathode consists of a mix of powdered material, such as powdered graphite, carbon black, activated carbon or charcoal, or manganese dioxide, which may be agglomerated with a suitable binder and baked, considerable difficulties are encountered in making positive electrode plates. The main difficulty resides in the problems of securing the depolarizer on a conductive substrate or carrier so that there is good electrical contact therebetween and, furthermore, of preventing the depolarizer from swelling in contact with the electrolyte whereby the necessary cohesion of the depolarizer particles may be lost.

It is the primary object of the present invention to provide a positive electrode plate for a galvanic element with sufficient rigidity to dispense with either a rigid electrode housing or an outer pressure designed to maintain the depolarizer mass in the plate shape. Such a positive electrode plate may, therefore, be handled during manufacture of the battery like the rod-shaped electrodes in cylindrical batteries.

It is a further object of this invention to provide high-capacity positive battery plates which may be mounted in a primary battery cell without the use of any support means.

It is yet another object of the invention to provide such positive electrode plates wherein the depolarizer mass is so accessible to the air that good air diffusion will take place in the battery.

The above and other objects and advantages are accomplished in accordance with the invention by a positive electrode plate comprising a perforated laminate of a metallic foil and a chemically inert but electrically conductive foil, the laminate forming the wall of a pocket being open at one end to permit access of air into the pocket, a grid in said pocket and bonded to the laminate walls, and depolarizer plates mounted on the outsides of the laminate walls.

To prevent undesirable penetration of electrolyte into the porous mass of the depolarizer, the structure may be coated with a lacquer foil which encompasses the depolarizer plates with sufficient tension to secure them in place on the laminate walls.

According to another preferred embodiment, stiffening bands are arranged along the open end of the pocket and these bands form a strong bond with the lacquer foil.

In yet another preferred embodiment, the metallic and conductive foils of the laminate have registering perforations and the diameters of the perforations in the metallic foil are larger than those of the perforations in the conductive foil.

The above and other features of the invention will be more readily understood when considered in connection with the following detailed description of a preferred embodiment, taken in conjunction with the accompanying drawings wherein FIG. 1 is a top view of the laminated carrier of the depolarizer mass, showing the metallic foil and the conductive foil partially broken away;

Figure 1:
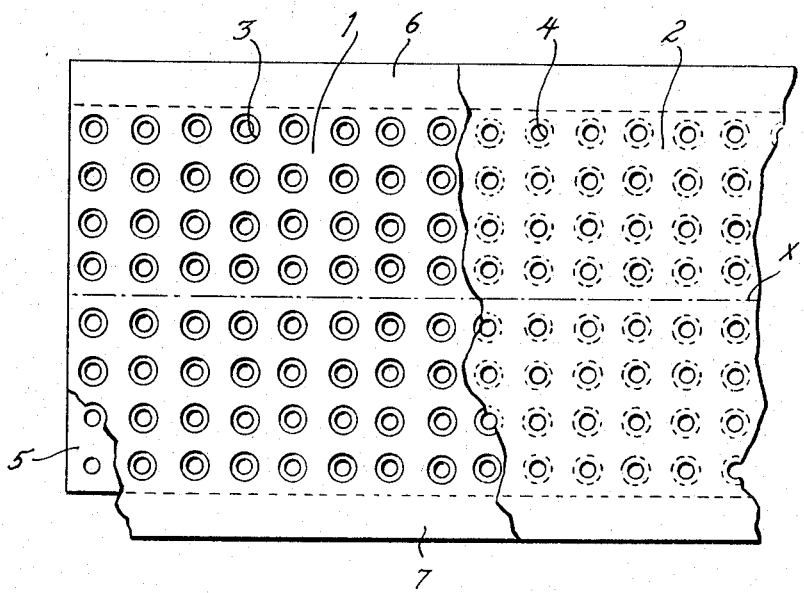

Referring now to the drawings, there is shown a laminated sheet of a metal foil 1, which may be of aluminum, and an electrically conductive sheet 2, which may be of graphite or carbon black with a suitable binder preferably polyisobutylene. Metal foil 1 may also be made of copper, zinc, tin or alloys of the same, but preferably of brass.

As shown, the laminated sheet is perforated, the preferred and illustrated manner of perforation consisting of a series of regularly spaced rows of round holes 3 in metal foil 1 and corresponding rows of round holes 4 in conductive foil 2, the holes 3 and 4 being in registry and the somewhat larger holes 3 being concentrically arranged about the smaller holes 4. The hole diameters may vary widely but, preferably, the diameter of holes 3 is about 3 mm. to 7 mm., according to the size of the battery while the diameter of the smaller holes is 1 mm. to 3 mm. less than the diameter of larger holes 3.

The two foils are firmly pressed together and bonded, for instance, by heat or by the application of a solvent for the binder such as benzine, carbon tetrachloride, etc., to constitute a unit.

Metal foil 1 is then coated with protective coating which does not swell in salt solutions and which firmly adheres to the foil. A suitable insulating lacquer, preferably a nitrocellulose lacquer coating 5, has been found useful for this purpose. Other useful materials for the protective coating include polyvinylchloride and polystyrene. However, a small strip 6 and 7 is left free of insulation along each longitudinal edge of the foil 1 so that the battery terminal may be attached to these conductive strips when the battery is assembled, as will be more fully explained hereinafter.

In the manufacture of the laminate, it is preferred to use an aluminum foil 1 from which the holes 3 have been stamped, while the conductive foil 2 is perforated only after the aluminum foil of the laminate has been covered with the insulating lacquer and the insulating coating has dried on foil 1. At this point, the smaller holes 4 are stamped into the laminated sheet which is insulated on one side whereby the aluminum foil remains fully covered with insulation, except for the longitudinal strips 6 and 7. This avoids the possibility of a corrosion of metal foil 1 by the depolarizer mass to be mounted on the other side of the laminated sheet and/or during the operation of the battery.

Figure 4:
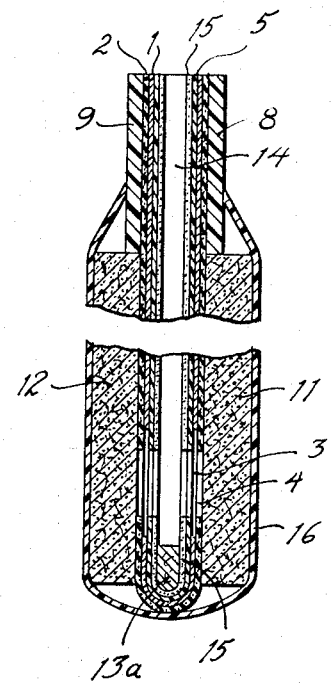
FIG. 4 is a vertical cross section of the assembled positive electrode plate.

As best seen in FIG. 4, it is preferred to mount a reinforcing strip 8 and 9 on the conductive foil 2 in registry with strips 6 and 7, respectively, which will impart rigidity to the edges of the laminated carrier sheet in the assembled electrode. The reinforcing strips may consist of cellulose triacetate bands or other suitable non-conductive material, such as nitrocellulose. They may be bonded to the conductive foil by any suitable adhesive agent, such as nitrocellulose in acetone.

Figure 2:
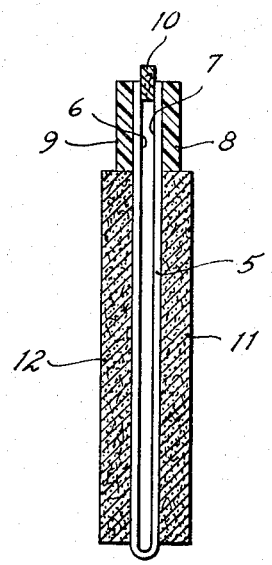
FIG. 2 shows a vertical cross section showing one assembly stage of the positive electrode plate incorporating the laminated carrier of FIG. 1 in folded condition to form a pocket open at one end.

After the laminated carrier sheet has been prepared in the above-described manner, it is folded along its longitudinally extending center line $x$, see FIG. 1, about a thin plate 10, see FIG. 2. The plate 10 consisting of cardboard, polyvinylchloride or other thermoplastic resin may be, for instance, about 1 to 2 mm. thick to provide a pocket 14 open at one end and defined by the laminated sheet wall which is now U-shaped and has two side walls parallel to each other. In this shape, a suitable depolarizer mix is now pressed onto the conductive foil on both sides of the U-shaped carrier to form depolarizer plates 11 and 12. The depolarizer mix covers the conductive foil from the fold line up to the reinforcing strips 8 and 9, as seen in FIGS. 2 and 4. After the depolarizer mix has been pressed onto the laminated sheet carrier, support plate 10 is withdrawn from the open end of the carrier pocket. This may be accomplished without difficulty because the parallel laminated sheet legs of the U-shaped carrier may readily be bent apart about the fold line $x$. After the temporary support plate 10 has been withdrawn, a rigid grid 13 is introduced into the pocket of the U-shaped carrier.

Figure 3:
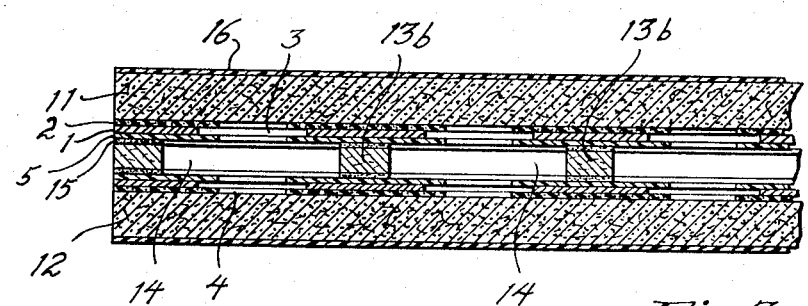
FIG. 3 is a longitudinal cross section of the positive electrode plate with the grid mounted in the pocket.
Figure 5:
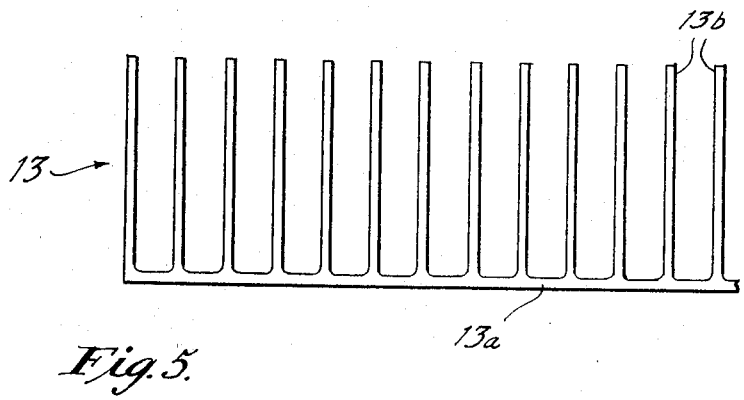
FIG. 5 shows the grid in side view.

As shown in FIG. 5, the grid consists of a longitudinally extending base bar 13a and a series of parallel, equidistantly spaced rods 13b integral with, and at right angles to, the base bar. The grid is coated with a suitable adhesive agent, such as a solution of nitrocellulose in acetone, so that the grid will adhere to the insulated metal foil 1, as shown at 15 in FIGS. 3 and 4, when the electrode is assembled and the two legs of the U-shaped carrier are bent back into parallel relationship and pressed together against the grid. In this manner, the flexible laminated sheet will form a rigid carrier for the depolarizer plates 11 and 12. The thickness of the grid fixes the spacing of the two carrier legs and the corresponding width of the pocket 14 therebetween whereby air may enter into the pocket and diffuse into the depolarizer mass through the perforated carrier.

Obviously, the nature of the depolarizer mix has no bearing on the present invention and any conventional mix used in air-depolarized batteries may be used. Usually, these depolarizers are one or other variety of activated carbon mixed with graphite or carbon black.

The grid may be made of a suitable conductive or non-conductive material, such as cardboard, polyethylene or metal, preferably cardboard.

In the preferred embodiment shown in FIG. 4, the thus assembled positive electrode plate is immersed in a cellulose triacetate lacquer solution, with the bottom of the U-shaped carrier leading and until the electrode is immersed up to about half the width of strips 8 and 9. The composition of the cellulose triacetate solution is such that the resultant coating is permeable to the electrolyte used in the battery and thus does not impede the efficiency of the depolarizer. For instance, the solution consists of cellulose triacetate dissolved in a mixture of methylene chloride and alcohol. Other suitable coatings for this purpose include nitrocellulose lacquers.

After the electrode is withdrawn from the coating solution, the same will dry and shrink about the depolarizer so that the skin 16 will hold the depolarizer firmly on its carrier. This will be accomplished only if the coating adheres strongly to the strips 8 and 9 so that the materials for the strips and the coating must be selected accordingly to provide strong bonding to each other. Good results have been achieved if both are made of cellulose triacetate which is known to have the property of contraction on drying but the skilled in the plastics art will be able to provide other suitable material combinations to attain similar results.

Figure 6:
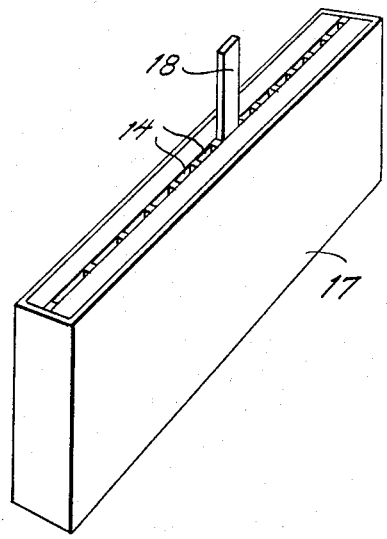
FIG. 6 is a perspective view of an air-depolarized battery wherein the positive electrode is arranged in a zinc container.

The complete positive electrode plate, as illustrated in FIG. 4, may be used in the manufacture of air-depolarized batteries in the same manner as positive electrodes are assembled in cylindrical batteries. Thus, as shown in FIG. 6, the positive electrode plate may be mounted in a correspondingly shaped negative electrode, for instance, a zinc cup 17. Such a primary battery cell will have very large effective electrode surfaces and excellent efficiency.

The positive electrode plate is sealed into the zinc cup in the conventional manner after a suitable electrolyte, such as solution of one or more of the following salts, ammonium chloride, zinc chloride, magnesium chloride, manganese chloride, has been placed in the cup. The positive terminal is provided by a copper strip 18 which is soldered or otherwise connected to the uncovered longitudinal strip 6 or 7 of metal foil 1 of the laminated carrier sheet.

Particularly large electrode surfaces are best obtained by increasing only the length of the electrode plate while keeping its height, i.e. the length of the legs of the U-shaped carrier, low enough to permit good access of air to all parts of the electrode through pocket 14 and also to assure the rigidity of the electrode plate. Useful dimensions for the positive electrode plate range between a length of up to 500 mm. and a height of up to 60 mm.

While the invention has been described in connection with certain preferred embodiments, it will be clearly understood that many modifications and variations may occur to the skilled in the art without departing from the spirit and scope of this invention as defined in the appended claims.

I claim:

1. In a positive electrode assembly for an air-depolarized battery cell, a spacing grid, a sub-assembly U-shaped in transverse section surrounding the grid and including, in sequence from the opposite surfaces of the grid outward, an insulating layer, a metallic foil layer, and a non-metallic conductive foil layer comprising a binder material, all three layers being perforated in registry with one another, a portion of the inwardly facing surfaces of the metallic foil layer adjacent opposite surfaces of the grid being free of the insulating layer at the U termini to receive a battery terminal therebetween and a portion of the outwardly facing surfaces of the non-metallic conductive layer extending the length of the edges thereof at the U termini being covered by insulating strips, the adjacent parallel portions of the outwardly facing surfaces of the non-metallic conductive layer being covered by depolarizer plates composed of non-metallic material relatively free of binder material, and an electrolyte-permeable insulating skin U-shaped in transverse section adherent to the insulating strips on opposite sides of the sub-assembly and enveloping the depolarizer plates and the intervening portions of the sub-assembly and the grid and retaining the same in laterally compressive contact with one another.

2. The electrode assembly of claim 1 including an adhesive layer bonding the grid to the insulated adjacent facing surfaces of the metallic foil layer.

3. The electrode assembly of claim 1 wherein the grid has a base portion extending the length of the assembly at the bight of the U and has extending therefrom spaced parallel rodlike portions terminating within the U termini.

4. The electrode assembly of claim 1 having a battery terminal affixed thereto in electrically conductive contact with the uninsulated portion of the inwardly facing metallic foil layer.

5. A positive electrode plate for an air-depolarized battery cell, comprising a perforated laminated carrier sheet of a metal foil and a chemically inert but electrically conductive non-metallic foil, the respective foils having perforations therein in registry with one another, the carrier sheet being U-shaped and forming two substantially parallel side walls having on their facing surfaces a protective coating of insulating material open at the perforations and terminating short of the parallel spaced ends thereof to accommodate a battery terminal, the walls defining a pocket therebetween which is open at one end to permit access of air into the pocket, a grid in said pocket and bonded by an adhesive coating to the walls of the laminated carrier sheet, depolarizer plates essentially free of binder material mounted on the outsides of the side walls of the laminated carrier sheet and terminating short of the parallel spaced ends thereof, non-conductive reinforcing strips covering the longitudinal edges of the sheet left uncovered by the depolarizer plates, and an electrolyte-permeable skin coating the depolarizer plates and having an inherent tension pressing the plates against the carrier sheet and holding them firmly thereon the skin enclosing the depolarizer plates and the intervening portions of the sheet and adhering to the reinforcing strips.

6. The positive electrode plate of claim 5, wherein the strips and the skin are composed of cellulose triacetate.

7. The positive electrode plate of claim 5, wherein the metal foil faces the pocket and the holes in the metal foil have a larger diameter than the holes in the other conductive foil, the larger holes being concentrically arranged in relation to corresponding ones of the smaller holes.

8. The positive electrode plate of claim 5, wherein the protective coating does not swell in aqueous salt solutions and firmly adheres to the metal foil.

9. The positive electrode plate of claim 8, wherein the coating is a nitrocellulose lacquer.

10. The positive electrode plate of claim 8, wherein the protective coating is spaced from the longitudinal edges of the side walls to leave longitudinal strips of the metal foil free of coating.

11. The positive electrode of claim 5, wherein the height of the side walls is small in relation to the length.

12. An air-depolarized battery cell comprising a generally rectangular zinc cup and arranged therein a positive electrode plate comprising a perforated laminated carrier sheet of a metal foil and a chemically inert but electrically conductive non-metallic foil, the respective foils having perforations therein in registry with one another, the carrier sheet being U-shaped and forming two substantially parallel side walls having on their facing surfaces a protective coating of insulating material open at the perforations and terminating short of the parallel spaced ends thereof to accommodate a battery terminal, the walls defining a pocket therebetween which is open at one end to permit access of air into the pocket, a grid in said pocket and bonded by an adhesive coating to the walls of the laminated carrier sheet, depolarizer plates essentially free of binder material mounted on the outsides of the side walls of the laminated carrier sheet and terminating short of the parallel spaced ends thereof, non-conductive reinforcing strips covering the longitudinal edges of the sheet left uncovered by the depolarizer plates, and an electrolyte-permeable skin coating the depolarizer plates and having an inherent tension pressing the plates against the carrier sheet and holding them firmly thereon the skin enclosing the depolarizer plates and the intervening portions of the sheet and adhering to the reinforcing strips.

13. The battery cell of claim 12, further comprising a positive terminal connected to an uncoated edge portion of the metallic foil of the laminated carrier sheet.

References Cited by the Examiner

UNITED STATES PATENTS

| 1,182,759 | 5/1916 | Emanull | 136—86 |
| 2,000,815 | 5/1935 | Berl | 136—86 |
| 2,848,525 | 8/1958 | Schumacher et al. | 136—102 |
| 2,938,064 | 5/1960 | Kordesch | 136—86 |

FOREIGN PATENTS

| 206,025 | 4/1959 | Austria. |
| 1,236,824 | 6/1960 | France. |

WINSTON A. DOUGLAS, *Primary Examiner.*

JOHN R. SPECK, ALLEN B. CURTIS, *Examiners.*

H. FEELEY, *Assistant Examiner.*